US012585379B2

(12) United States Patent
Sanchit et al.

(10) Patent No.: US 12,585,379 B2
(45) Date of Patent: Mar. 24, 2026

(54) METHODS AND SYSTEMS FOR GENERATING IMAGE TOOL RECOMMENDATIONS

(71) Applicant: Canva Pty Ltd, Surry Hills (AU)

(72) Inventors: Sanchit Sanchit, Vienna (AT); Alexander Tack, Vienna (AT); Stefan Paul Sietzen, Salzburg (AT)

(73) Assignee: CANVA PTY LTD, Surry Hills (AU)

( * ) Notice: Subject to any disclaimer, the term of this patent is extended or adjusted under 35 U.S.C. 154(b) by 0 days.

(21) Appl. No.: 18/882,463

(22) Filed: Sep. 11, 2024

(65) Prior Publication Data

US 2025/0094030 A1     Mar. 20, 2025

(30) Foreign Application Priority Data

Sep. 14, 2023    (AU) ................................. 2023229569

(51) Int. Cl.
| | |
|---|---|
| *G06F 3/04845* | (2022.01) |
| *G06F 40/20* | (2020.01) |
| *G06N 20/00* | (2019.01) |
| *G06T 11/60* | (2006.01) |

(52) U.S. Cl.
CPC ......... *G06F 3/04845* (2013.01); *G06N 20/00* (2019.01); *G06T 11/60* (2013.01); *G06F 40/20* (2020.01); *G06T 2200/24* (2013.01)

(58) Field of Classification Search
None
See application file for complete search history.

(56) References Cited

U.S. PATENT DOCUMENTS

| | | |
|---|---|---|
| 5,990,901 A | 11/1999 | Lawton et al. |
| 2013/0290944 A1 | 10/2013 | Menon et al. |
| 2014/0078075 A1 | 3/2014 | Wilensky et al. |
| 2016/0284381 A1 | 9/2016 | Yang |
| 2019/0258498 A1 | 8/2019 | Chandan et al. |
| 2020/0042286 A1 | 2/2020 | Bui et al. |
| 2020/0066261 A1 | 2/2020 | Ganz et al. |
| 2020/0175975 A1 | 6/2020 | Kong et al. |
| 2020/0410990 A1 | 12/2020 | Ganz et al. |
| 2021/0240770 A1* | 8/2021 | Kleiner ................. G06F 16/908 |
| 2022/0122483 A1* | 4/2022 | Krasley .................. A41H 42/00 |
| 2023/0402156 A1* | 12/2023 | Londono ................ G06V 10/25 |
| 2024/0126419 A1* | 4/2024 | Makhijani ........... G06F 3/04845 |

OTHER PUBLICATIONS

Examination Report No. 1 for Australian Patent Application No. 2023229569 mailed Oct. 31, 2023, pp. 1-6.

* cited by examiner

*Primary Examiner* — James A Thompson
(74) *Attorney, Agent, or Firm* — GrowIP Law Group LLC

(57) ABSTRACT

Described embodiments generally relate to a method of generating an image editing tool recommendation. The method includes receiving a prompt entered by a user; processing the prompt using a tool class prediction model to predict a tool class associated with the prompt, wherein the tool class is associated with at least one image editing tool that is configured to perform an image editing function described by the prompt; determining an image editing tool associated with the predicted tool class; and outputting a recommendation to the user directing the user to the determined image editing tool.

20 Claims, 5 Drawing Sheets

300

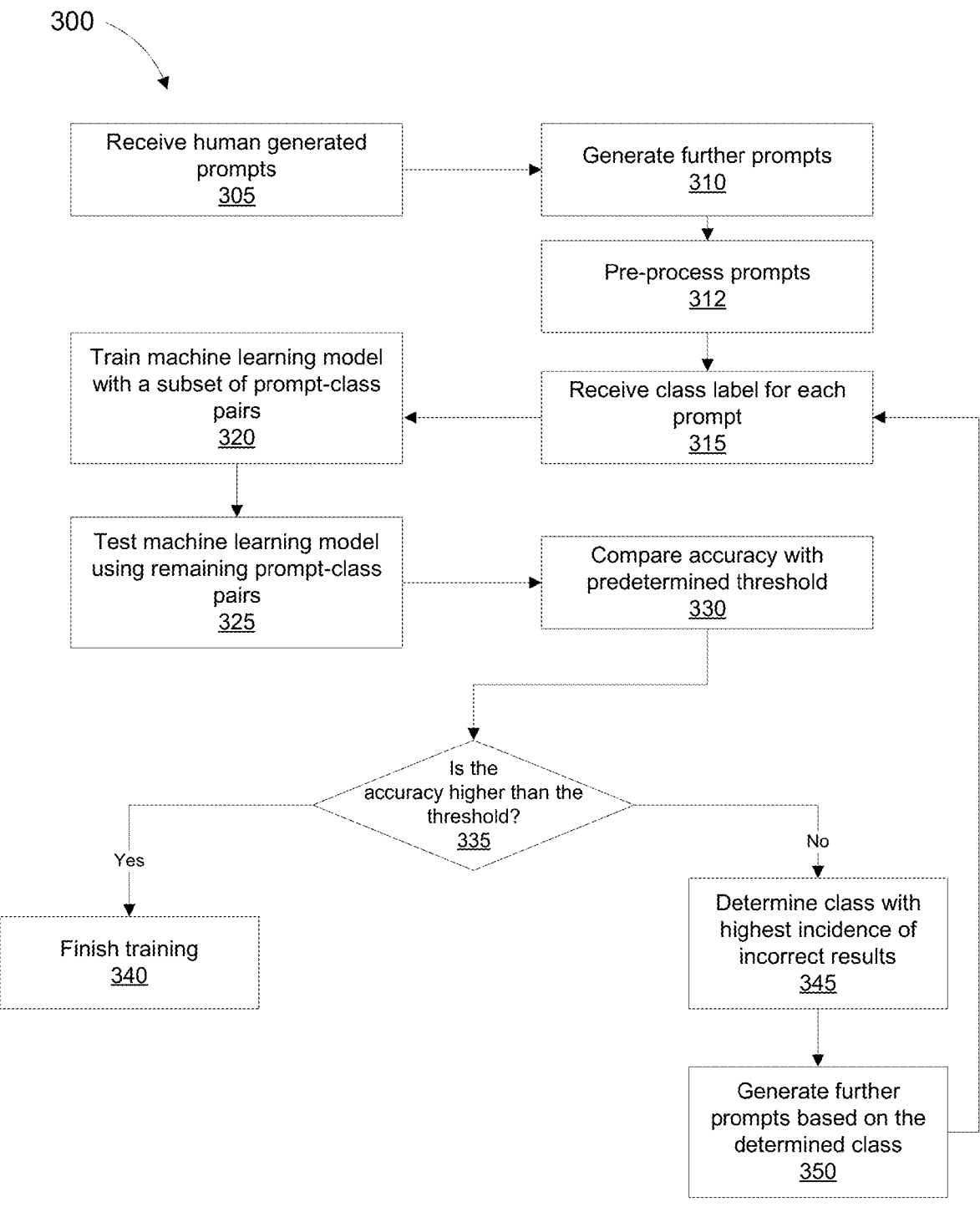

Receive human generated
prompts
305

Generate further prompts
310

Pre-process prompts
312

Train machine learning model
with a subset of prompt-class
pairs
320

Receive class label for each
prompt
315

Test machine learning model
using remaining prompt-class
pairs
325

Compare accuracy with
predetermined threshold
330

Is the
accuracy higher than the
threshold?
335

Yes

No

Finish training
340

Determine class with
highest incidence of
incorrect results
345

Generate further
prompts based on the
determined class
350

Fig. 3

METHODS AND SYSTEMS FOR GENERATING IMAGE TOOL RECOMMENDATIONS

CROSS-REFERENCE TO RELATED APPLICATIONS

This application is a U.S. Non-Provisional Application that claims priority to and the benefit of Australian Patent Application No. 2023229569, filed Sep. 14, 2023, that is hereby incorporated by reference in its entirety.

TECHNICAL FIELD

Described embodiments relate to systems and methods for generating image editing tool recommendations. In particular, described embodiments relate to systems and methods for generating image editing tool recommendations in response to user-provided prompts.

BACKGROUND

Digital image editing tools allow a user to edit digital images via a software platform. Many different tools may be available, each performing a specific function. For example, a background remover tool may be configured to automatically remove the background of an image, while an image enhancing tool may be configured to adjust the brightness or contrast of an image. Each tool may be designed to perform one specific function or a selection of related functions.

However, users of digital image editing software may attempt to use an editing tool to perform a function that it was not designed to perform. When this happens, the user may not get the desired image editing results.

It is desired to address or ameliorate one or more shortcomings or disadvantages associated with prior systems and methods for digital image editing, or to at least provide a useful alternative thereto.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Some embodiments relate to a method of generating an image editing tool recommendation, the method comprising:

receiving a prompt entered by a user;

processing the prompt using a tool class prediction model to predict a tool class associated with the prompt, wherein the tool class is associated with at least one image editing tool that is configured to perform an image editing function described by the prompt;

determining an image editing tool associated with the predicted tool class; and outputting a recommendation to the user directing the user to the determined image editing tool.

Some embodiments further comprise accessing a tool class dataset containing at least one tool class to determine a number of available tool classes.

In some embodiments, the tool class prediction model is configured to predict the tool class associated with the prompt by selecting a tool class from the tool class dataset.

In some embodiments, the tool class prediction model is configured to select the tool class that is the closest match for the image editing function described by the prompt.

According to some embodiments, the prompt is received in response to the user's interaction with a first image editing tool associated with a first tool class; the predicted tool class associated with the prompt is a second tool class; the determined image editing tool is a second image editing tool associated with a second tool class; and the recommendation directs the user to the second image editing tool.

Some embodiments further comprise comparing the first tool class with the second tool class, and outputting the recommendation in response to determining that the first tool class is not the same as the second tool class.

According to some embodiments, outputting a recommendation comprises generating and displaying a user interface element that provides access to the determined image editing tool.

In some embodiments, the user interface element comprises a virtual button.

In some embodiments, the user interface element comprises a hyperlink.

According to some embodiments, the user interface element provides access to purchase the determined image editing tool.

In some embodiments, outputting a recommendation comprises automatically opening the determined image editing tool.

Some embodiments further comprise, in response to the determined image editing tool being opened, passing the prompt to the determined image editing tool.

Some embodiments further comprise receiving a user-selected area of an image for editing.

Some embodiments further comprise, in response to the determined image editing tool being opened, passing the user-selected area of the image to the determined image editing tool.

Some embodiments further comprise, in response to the determined image editing tool being opened, passing an image to be edited to the determined image editing tool.

In some embodiments, the tool class prediction model is a machine learning model.

In some embodiments, the tool class prediction model is a natural language processing model.

According to some embodiments, the natural language processing model is a large language model.

In some embodiments, outputting a recommendation to the user comprises initiating the determined image editing tool.

Some embodiments further comprise training the tool class prediction model to predict the tool class by providing the tool class prediction model with a plurality of prompt-class pairs, and training the tool class prediction model to predict a tool class based on a provided prompt.

Some embodiments relate to a method of training a tool class prediction model to generate an image editing tool recommendation, the method comprising:

accessing a tool class dataset containing at least one tool class to determine a number of available tool classes;

receiving a first labelled set of prompts each prompt being labelled with a tool class from the tool class dataset;

training a first machine learning model to generate additional labelled prompts based on the first labelled set of prompts;

adding the additional labelled prompts to the first labelled set of prompts to form a second labelled set of prompts; and training a second machine learning model on the second labelled set of prompts;

wherein, once trained, the second machine learning model is configured to receive a prompt and output a corresponding tool class label from the tool class dataset.

Some embodiments further comprise calculating an accuracy of the tool class prediction model, comparing the accuracy to a threshold, and, in response to the accuracy not meeting the threshold, further training the tool class prediction model by providing the tool class prediction model with additional prompt-class pairs.

Some embodiments relate to a non-transitory computer-readable storage medium storing instructions which, when executed by a processing device, cause the processing device to perform the method of some other embodiments.

Some embodiments relate to a computing device comprising:

the non-transitory computer-readable storage medium of some other embodiments; and a processor configured to execute the instructions stored in the non-transitory computer-readable storage medium.

BRIEF DESCRIPTION OF DRAWINGS

Various ones of the appended drawings merely illustrate example embodiments of the present disclosure and cannot be considered as limiting its scope.

FIG. 3 is a process flow diagram of a method of training a machine learning model to generate image editing tool recommendations according to some embodiments;

DESCRIPTION OF EMBODIMENTS

Described embodiments relate to systems and methods for generating image editing tool recommendations. In particular, described embodiments relate to systems and methods for generating image editing tool recommendations in response to user-provided prompts.

Digital image editing tools provide image editing functions to users. Sometimes, several different tools may be provided within a single software application or platform. Each tool may be designed to perform one or more specific image editing functions. Some tools will require additional user input to operate. For example, some tools may require that a user enter a numerical parameter relating to the editing function that is to be performed. Some tools may require that a user select an area of an image to be edited, such that the editing function is applied to the selected area.

Some tools may use machine learning to assist with performing image editing functions. For example, some tools may allow a user to enter a prompt to be processed by a machine learning model, where the prompt is used to guide the editing to be performed. These prompts may be natural language prompts in some instances, and may be entered as a text prompt. Some image editing tools may be configured to insert a new image element into an image being edited based on a user supplied prompt. Some image editing tools may be configured to edit an existing image element based on a user supplied prompt.

Where an image editing tool being used by a user asks for a user prompt, and a prompt is supplied by a user, in some cases the nature of the prompt may indicate that a different image editing tool than the one being used may be better suited to perform the function that the user intends.

Figure 1B:
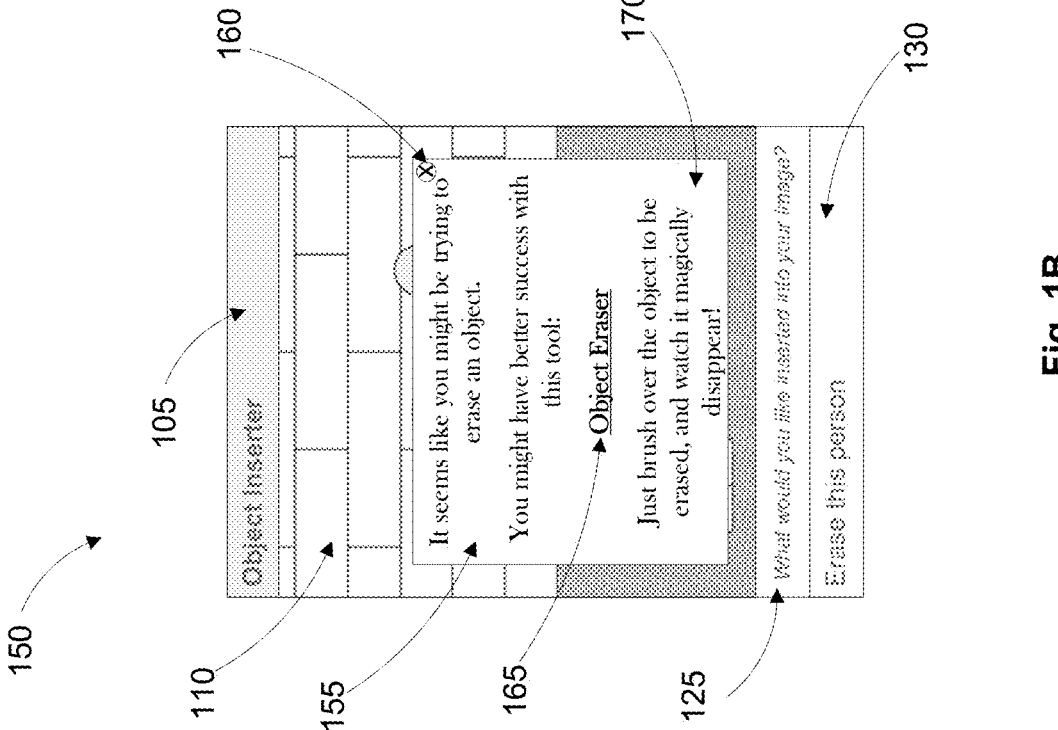
FIG. 1B shows an example user interface illustrating an image editing tool recommendation according to some embodiments.
Figure 1A:
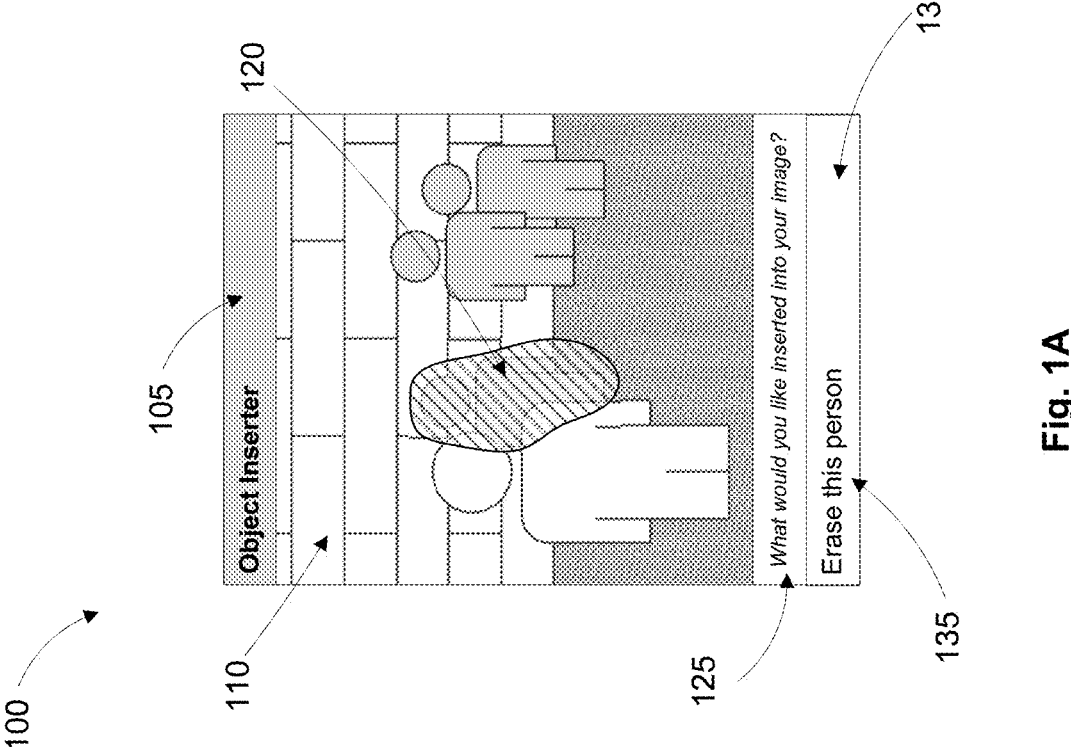
FIG. 1A shows an example user interface illustrating an image editing tool according to some embodiments.

FIG. 1A shows an example graphical user interface 100. Interface 100 may be presented to a user using an image editing tool. Specifically, in the illustrated example, interface 100 is presented to a user using an "Object Inserter" tool, as indicated by header 105. The "Object Inserter" tool may be a tool that generates and inserts a new image element into an image based on a user prompt. A user selected image 110 is displayed for editing.

Interface 100 shows a user selected area 120 overlaid on image 110. According to some embodiments, the user wishing to edit image 110 using the "Object Inserter" tool may interact with a user interface component of a computing device displaying image 110 to indicate which area of image 110 they wish to insert an object into by creating the user selected area 120. For example, the user may use a brush tool, trace tool, or other tool to digitally select, trace, circle, or "paint" over the area where they wish to place the new visual element, to produce the user selected area 120.

In the illustrated example, interface 100 also includes an instruction 125 to enter a prompt in response to the question "What would you like inserted into your image?". The user may enter a prompt in response to instruction 125 via text entry field 130. In the illustrated example, the user has entered prompt 135, which reads "Erase this person".

As the "Object Inserter" tool is configured to generate and insert a new image element into image 110 based on the user prompt, the result of entering the prompt "Erase this person" may not be what the user intended. Based on the prompt, the user may be intending that the person shown in image 110 in the area corresponding to user selected area 120 be erased. However, under normal operation, the "Object Inserter" tool may instead try to generate a new image element based on the user prompt and insert the generated image element into user selected area 120. This may lead to unexpected and undesirable results.

According to some embodiments, systems and methods for generating image editing tool recommendations are provided which may assist a user in the situation described above. Specifically, the described systems and methods may provide a user with a recommendation for an image editing tool based on their entered prompt which may be better suited to the image editing function the user is trying to perform.

FIG. 1B shows an example graphical user interface 150. Interface 150 may be presented to a user in response to an image editing tool recommendation being generated. Specifically, in the illustrated example, interface 150 is presented to a user using an "Object Inserter" tool, in response to a user-entered prompt that indicates that the user was attempting to perform an image editing function that is better performed by an "Object Eraser" tool.

Interface 150 shows the elements of the "Object Inserter" tool as displayed in FIG. 1A, such as the header 105, image 110, instruction 125 and text entry field 130. However, these user interface elements are inactive and are illustrated as greyed out. A pop-up box 155 is displayed over the inactive elements, presenting the user with an image editing tool recommendation. Pop-up box 155 reads "It seems like you might be trying to erase an object. You might have better success with this tool:". A tool recommendation 165 is displayed, which reads "Object Eraser". The tool recommendation 165 may be an interactive user interface element, such as a hyperlink, allowing a user to access the recommended tool or further information about the recommended tool. A brief description 170 of the recommended tool is displayed, which reads "Just brush over the object to be erased, and watch it magically disappear!". An exit button 160 is displayed. Interacting with exit button 160 may cause pop-up box 155 to close, and the elements of the "Object Inserter" tool to become re-activated.

Figure 2:
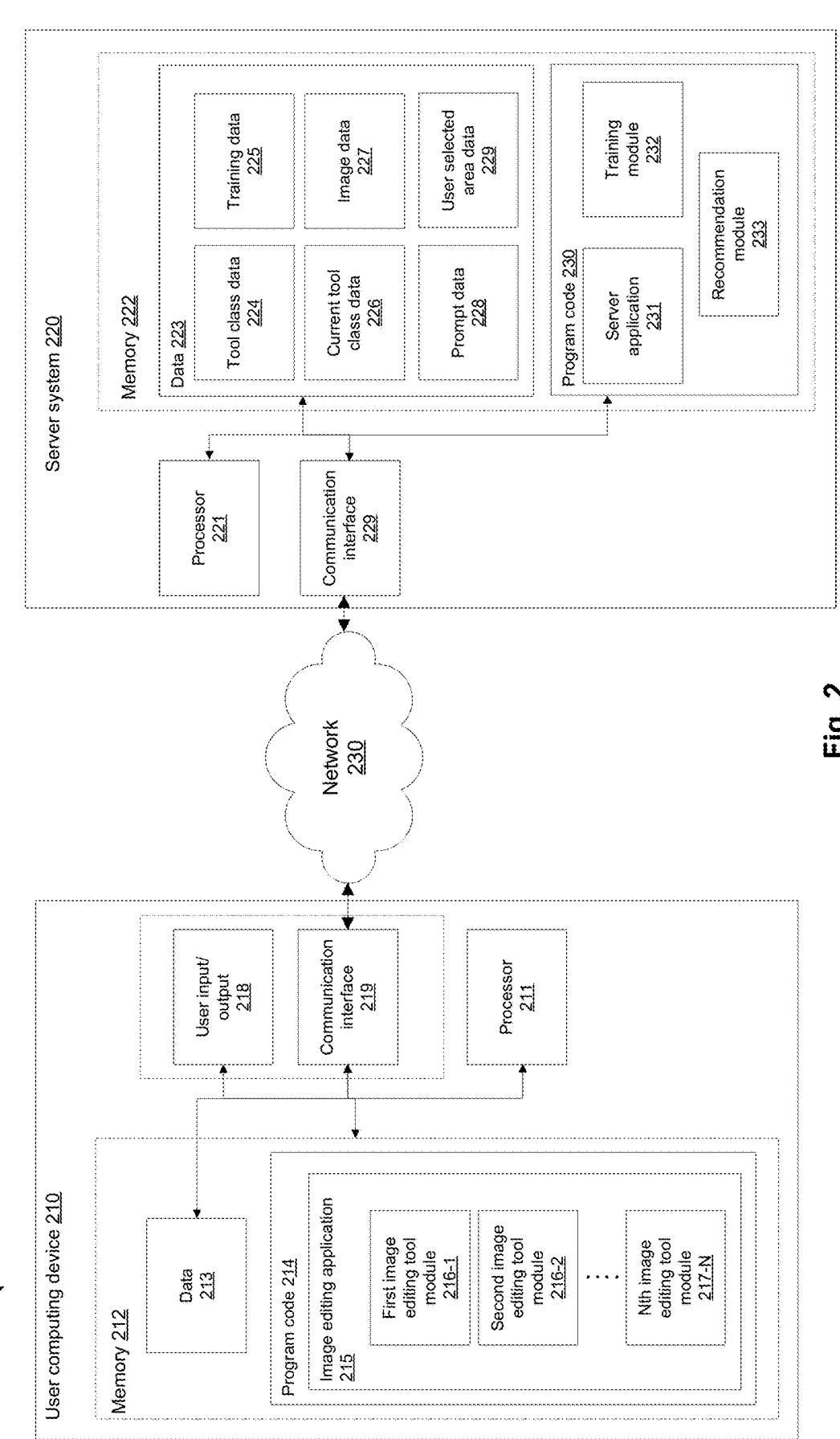
FIG. 2 is a schematic diagram of a system for generating image editing tool recommendations according to some embodiments.

FIG. 2 shows an example arrangement of system components that may be used to perform the presently disclosed methods. Of course, the system of FIG. 2 is simply one embodiment that would be suitable for performing the present methods.

FIG. 2 is a block diagram showing an example system 200 that may be used for generating image editing tool recommendations according to some described embodiments.

System 200 comprises a user computing device 210 which may be used by a user wishing to edit one or more images. In the illustrated embodiment, system 200 further comprises a server system 220. User computing device 210 may be in communication with server system 220 via a network 230. However, in some embodiments, user computing device 210 may be configured to perform the described methods independently, without access to a network 230 or server system 220.

User computing device 210 may be a computing device such as a personal computer, laptop computer, desktop computer, tablet, or smart phone, for example. User computing device 210 comprises a processor 211 configured to read and execute program code. Processor 211 may include one or more data processors for executing instructions, and may include one or more of a microprocessor, microcontroller-based platform, a suitable integrated circuit, and one or more application-specific integrated circuits (ASIC's).

User computing device 210 further comprises at least one memory 212. Memory 212 may include one or more memory storage locations which may include volatile and non-volatile memory, and may be in the form of ROM, RAM, flash or other memory types. Memory 212 may also comprise system memory, such as a BIOS.

Memory 212 is arranged to be accessible to processor 211, and to store data 213 that can be read and written to by processor 211. Memory 212 may also contain program code 214 that is executable by processor 211, to cause processor 211 to perform various functions. For example, program code 214 may include an image editing application 215. Processor 211 executing image editing application 215 may be caused to perform various image editing functions. In some embodiments, image editing application 215 may comprise a plurality of image editing tool modules 216. In the illustrated example, first image editing tool module 216-1, second image editing tool module 216-2 through to Nth image editing tool module 216-N are illustrated. However, any number of image tool editing modules 216 may reside as part of image editing application 215. Each image editing tool module 216 may cause a different image editing function to be performed. These may include, but are not limited to: removing the background and/or extracting the foreground subject of an image; erasing or removing part of an image; enhancing the image by adjusting the brightness, contrast, or other colour properties; focusing on a subject of the image while blurring the rest of the image; blurring the overall image; editing an existing object in an image; and adding a new generated object into the image.

According to some embodiments, each image editing tool module 216 may instead reside within a separate image editing application 215. According to some embodiments, image editing tool modules 216 may reside within memory 222 of server system 220, and may be executable by processor 221.

According to some embodiments, image editing application 215 may be a standalone application in the form of a smartphone application or desktop application that provides image editing functionality. In some embodiments, image editing application 215 may be a web browser application (such as Chrome, Safari, Internet Explorer, Opera, or an alternative web browser application) which may be configured to access web pages that provide image editing functionality via an appropriate uniform resource locator (URL).

Program code 214 may include additional applications that are not illustrated in FIG. 2, such as an operating system application, which may be a mobile operating system if user computing device 210 is a mobile device, a desktop operating system if user computing device 210 is a desktop device, or an alternative operating system.

User computing device 210 may further comprise user input and output peripherals 218. These may include one or more of a display screen, touch screen display, mouse, keyboard, speaker, microphone, and camera, for example. User I/O 218 may be used to receive data and instructions from a user, and to communicate information to a user.

User computing device 210 also comprises a communications interface 219, to facilitate communication between user computing device 210 and other remote or external devices. Communications module 219 may allow for wired or wireless communication between user computing device 210 and external devices, and may utilise Wi-Fi, USB, Bluetooth, or other communications protocols. According to some embodiments, communications module 219 may facilitate communication between user computing device 210 and server system 220 via network 230, for example.

Network 230 may comprise one or more local area networks or wide area networks that facilitate communication between elements of system 200. For example, according to some embodiments, network 230 may be the internet. However, network 230 may comprise at least a portion of any one or more networks having one or more nodes that transmit, receive, forward, generate, buffer, store, route, switch, process, or a combination thereof, etc. one or more messages, packets, signals, some combination thereof, or so forth. Network 230 may include, for example, one or more of: a wireless network, a wired network, an internet, an intranet, a public network, a packet-switched network, a circuit-switched network, an ad hoc network, an infrastructure network, a public-switched telephone network (PSTN), a cable network, a cellular network, a satellite network, a fibre-optic network, or some combination thereof.

Server system 220 may comprise one or more computing devices and/or server devices, such as one or more servers, databases, and/or processing devices in communication over a network, with the computing devices hosting one or more application programs, libraries, APIs or other software elements. The components of server system 220 may provide server-side functionality to one or more client applications, such as image editing application 215 of user computing device 210. The server-side functionality may include operations such as user account management, login, and content creation functions such as image editing, saving, publishing, and sharing functions. According to some embodiments, server system 220 may comprise a cloud based server system. While a single server system 220 is shown, server system 220 may comprise multiple systems of servers, databases, and/or processing devices. Server system 220 may host one or more components of a platform for generating image editing tool recommendations.

Server system 220 may comprise at least one processor 221 and a memory 222. Processor 221 may include one or more data processors for executing instructions, and may include one or more of a microprocessor, microcontroller-based platform, a suitable integrated circuit, and one or more application-specific integrated circuits (ASIC's). Memory 222 may include one or more memory storage locations, and may be in the form of ROM, RAM, flash or other memory types.

Memory 222 is arranged to be accessible to processor 221, and to contain data 223 that processor 221 is configured to read and write to. Data 223 may store data such as user account data, image data, and data relating to image editing tools, such as machine learning models trained to perform image editing functions, as described in further detail below.

Data 223 may include tool class data 224. Tool class data 224 may store data relating to a number of different tool classes that may each be associated with different image editing tools provided by image editing application 215. According to some embodiments, each stored tool class within tool class data 224 may be associated with an individual image editing tool, which may be an image editing tool having an associated image editing tool module 216. According to some embodiments, each stored tool class within tool class data 224 may be associated with an at least one image editing tool that is configured to perform at least one image editing function.

Each tool class may be associated with one or more specific image editing functions. For example, there may be a background removal tool class, a foreground subject extraction tool class, an eraser tool class, an image enhancing tool class, a background blurring tool class, an image blurring tool class, an object editing tool class and/or an object generation tool class, in some embodiments. Each tool class may have one or more associated image editing tools, which may be tools capable of performing the associated image editing function. In some embodiments, a single image editing tool may be associated with more than one tool class. This may be the case where the image editing tool is configured to perform more than one image editing function, for example.

According to some embodiments, each stored tool class within tool class data 224 may have an associated identification number or code. For example, a first tool class may be associated with a first image editing module 216-1, which may be configured for removing the background and/or extracting the foreground subject of an image, and the tool class may be assigned the identification number "01". A second tool class may be associated with a second image editing module 216-2, which may be configured for erasing or removing part of an image, and the tool class may be assigned the identification number "02". A third tool class may be associated with a third image editing module 216-3, which may be for enhancing an image by adjusting the brightness, contrast, or other colour properties of the image, and the tool class may be assigned the identification number "03". A fourth tool class may be associated with a fourth image editing module 216-4, which may be configured for focusing on a subject of the image while blurring the rest of the image, and the tool class may be assigned the identification number "04". A fifth tool class may be associated with a fifth image editing module 216-5, which may be for blurring the overall image, and the tool class may be assigned the identification number "05". A sixth tool class may be associated with a sixth image editing module 216-6, which may be for editing an existing object in an image, and the tool class may be assigned the identification number "06". A seventh tool class may be associated with a seventh image editing module 216-7, which may be for adding a new generated object into an image, and the tool class may be assigned the identification number "07". Of course, these examples are given for illustrative purposes only. Image editing modules 216 may be associated with different functions than those described above, and the tool classes may be assigned different identification codes.

Data 223 may also include training data 225. Training data 225 may comprise a number of prompts to be used to train a machine learning model to generate image editing tool recommendations, as described below with reference to FIG. 3. Prompts may be labelled with a tool class selected from tool class data 224. For example, each prompt stored in training data 225 may be labelled with an identification number or code associated with a tool class selected from tool class data 224. According to some embodiments, each prompt may comprise a text string. In some alternative embodiments, prompts may be stored in an alternative format. According to some embodiments, at least some prompts may be human generated prompts. For example, a selection of prompts may be stored based on prompts entered by users using image editing tool modules 216. At least some prompts may be human generated prompts specifically written for training purposes. In some embodiments, at least some prompts may be machine generated prompts, as described in further detail below with reference to FIG. 3.

Data 223 may also temporarily store a current tool class in current tool class data 226. Current tool class data 226 may store the tool class of the current tool being used by a user of user computing device 210 executing image editing application 215. For example, if first image editing tool module 216-1 is being executed, current tool class data 226 may store the tool class "01". If first image editing tool module 216-1 is closed and a second image editing tool module 216-2 is executed, current tool class data 226 may be updated to "02". If second image editing tool module 216-2 is closed and first image editing tool module 216-1 is re-opened, current tool class data 226 may be re-updated to "01". Current tool class data 226 may be updated based on data received from user computing device 210 in response to a user interacting with image editing application 215 to launch image editing tool modules 216.

Data 223 may further comprise image data 227. Image data 227 may store data corresponding to an image that is being edited by image editing application 215, such as by image editing tool modules 216. Image data 227 may be received from user computing device 210 executing image editing application 215 in response to a user selecting or uploading an image to be edited.

Data 223 may also comprise prompt data 228. Prompt data 228 may be received from user computing device 210 in response to a user entering a prompt while executing image editing application 215, in order to perform an image editing function provided by an image editing tool module 216. For example, in the example illustrated in FIG. 1A, the user has entered the prompt 135 "Erase this person". Prompt 135 may be stored in prompt data 228 as a string of text.

Data 223 may further comprise user selected area data 229. User selected area data 229 may be received from user computing device 210 in response to a user selecting an area of an image while executing image editing application 215, in order to perform an image editing function provided by an image editing tool module 216. For example, in the example illustrated in FIG. 1A, the user has selected area 120. Area 120 may be stored in user selected area data 229.

Memory 222 further comprises program code 230 that is executable by processor 221, to cause processor 221 to execute workflows. For example, program code 230 comprises a server application 231 executable by processor 221 to cause server system 220 to perform server-side functions. According to some embodiments, such as where image editing application 215 is a web browser, server application 231 may comprise a web server such as Apache, IIS, NGINX, GWS, or an alternative web server. In some embodiments, the server application 231 may comprise an application server configured specifically to interact with image editing application 215. Server system 220 may be provided with both web server and application server modules.

Program code 230 may also comprise one or more code modules, such as one or more of a training module 232 and a recommendation module 233. As described in further detail below with reference to FIG. 3, executing training module 232 may cause processor 221 to perform a training process using training data 225 to train a machine learning model residing as part of recommendation module 233 to generate image editing tool recommendations. As described in further detail below with reference to FIG. 4, executing recommendation module 233 may cause processor 221 to perform a recommendation generation process based on prompt data 228.

Training module 232 and a recommendation module 233 may be software modules such as add-ons or plug-ins that operate in conjunction with the server application 231 to expand the functionality thereof. In alternative embodiments, modules 232 and 233 may be native to the server application 231. In still further alternative embodiments, modules 232 and 233 may be stand-alone applications (running on server system 220, or an alternative server system) which communicate with the server application 231.

While modules 232 and 233 have been described and illustrated as being part of/installed at the server system 220, the functionality provided by modules 232 and 233 could alternatively be provided by user computing device 210, for example as an add-on or extension to image editing application 215, a separate, stand-alone server application that communicates with image editing application 215, or a native part of image editing application 215.

Server system 220 also comprises a communications interface 229, to facilitate communication between server system 220 and other remote or external devices. Communications module 229 may allow for wired or wireless communication between server system 220 and external devices, and may utilise Wi-Fi, USB, Bluetooth, or other communications protocols. According to some embodiments, communications module 229 may facilitate communication between server system 220 and user computing device 210 via network 230, for example.

Server system 220 may include additional functional components to those illustrated and described, such as one or more firewalls (and/or other network security components), load balancers (for managing access to the server application 231), and or other components.

FIG. 3 is a process flow diagram of a method 300 of training a machine learning model to generate image editing tool recommendations. In some embodiments, method 300 may be performed at least partially by processor 221 executing training module 232. While certain steps of method 300 have been described as being executed by particular elements of system 200, such as by processor 221, these steps may be performed by different elements in some embodiments.

At step 305, processor 221 executing training module 232 receives human generated prompts. According to some embodiments, these prompts may be retrieved from training data 225. The received prompts may include prompts entered by users while executing image editing application 215, and/or particular image editing tool modules 216 of image editing application 215. For example, as illustrated in FIG. 1A, the prompt "Erase this person" may be generated by a user and stored in training data 225.

In some embodiments, prompts may include prompts generated specifically for training purposes and written to training data 225. The prompts may each comprise a string of characters or another representation of text. In some embodiments, the prompts may be audio files comprising spoken text, for example. Some examples of stored prompts may include "please erase that car from the selected area", "remove the background and replace it with the beach", "enhance the colors of this part of the image" and "blur the image". Of course, these are only illustrative examples, and the prompts may include a wide variety of content.

At step 310, processor 221 executing training module 232 is caused to generate additional prompts. According to some embodiments, this may be done by instructing a prompt generating machine learning model to generate additional prompts. This may be done by providing the prompt generating machine learning model with the prompts retrieved at step 305 and asking the prompt generating machine learning model to generate additional similar prompts. In some embodiments, this may alternatively be done by providing the prompt generating machine learning model with instructions as to the types of prompts to generate. For example, the prompt generating machine learning model may be instructed to "Generate a number of ways that a user might want to edit a picture, in the form of instructions from the user". According to some embodiments, the prompt generating machine learning model used to perform this step may be a large language model (LLM). The prompt generating machine learning model may comprise artificial neural networks. According to some embodiments, the prompt generating machine learning model may be trained using self-supervised or semi-supervised learning. According to some embodiments, the prompt generating machine learning model may use transformer architecture, and may be a generative pre-trained transformer model in some embodiments. The prompt generating machine learning model may be accessed via a chatbot, such as OpenAI's ChatGPT, for example. In some embodiments, the an alternative chatbot, such as one of OpenAI's ChatGPT, Google's Bard, Baidu's Ernie Bot, or Anthropic's Claude, may be used.

At step 312, processor 221 executing training module 232 is caused to pre-process the prompts received at steps 305 and 310. This may be by tokenising the prompts, which may produce integer values for each word of the prompt. In some embodiments, processor 221 may be caused to generate an encoding or embedding of the prompts. This may be generated using a text encoder such as OpenAI's CLIP text encoder. In alternative embodiments, the training model 232 may extract corresponding embeddings or encodings from the generated tokens without using an external text coder. The tokenised, encoded or embedded prompts may be more readily interpretable by a machine learning model during the training process.

At step 315, processor 221 executing training module 232 is caused to receive class labels for each of the received and generated prompts from steps 305 and 310. The received classes are stored in training data 255 in association with the corresponding prompt, which may be a tokenised, encoded or embedded prompt, to form a prompt-class pair. Any machine generated prompts may be hand labelled by a human with a class chosen from the classes stored in tool class data 224 before being stored in training data 225. According to some embodiments, an equal or similar number of prompts for each class of tool class data 224 may be stored in training data 225. For example, in some embodiments, around 2000 prompts may be stored per class.

At step 320, processor 221 executing training module 232 is caused to train a prediction generating machine learning model with a subset of the prompt-class pairs retrieved from training data 225 using a supervised machine learning technique. The subset may be a random subset. The prediction generating machine learning model may reside within recommendation module 233. According to some embodiments, the prediction generating machine learning model may be a natural language processing (NLP) model. This may be a large language model (LLM) in some embodiments. For example, a fine-tuned LLM such as OpenAI's GPT 3 may be used. In some embodiments, an alternative LLM such as OpenAI's GPT-3.5 or GPT-4, Google's PaLM or Meta's LLaMa may be used.

The prediction generating machine learning model may be trained to predict a tool class selected from tool class data 224 given a prompt. The model may be trained using training techniques configured for solving multi-class classification problems, with each class stored in tool class data 224 being a possible output. According to some embodiments, the model may be trained in a supervised learning manner using the class labels received at step 315.

The model may be trained by configuring the model to minimise a loss value over a training period. The model may be initiated with a random or default set of model parameters or weights. At each training step, the model may be caused to predict a class label based on a provided prompt. The predicted class label may be compared to the actual class value associated with the provided prompt to determine a value relating to how well the model is performing. According to some embodiments, this may be a loss value that increased with respect to poor performance or higher numbers of incorrect predictions. According to some embodiments, the loss value may be determined based on a cross-entropy loss function. The model parameters or weights may be adjusted over the course of the training period by selecting parameters that result in the loss value to decrease. In other words, the model may be trained by minimizing the loss value, so that the model is caused to make fewer mistakes when comparing the predicted class labels to the actual class labels associated with the provided prompt. The process of causing the model to predict class values, determining a loss function, and adjusting the model parameters may be repeated until the subset of the prompt-class pairs retrieved from training data 225 have all been processed, which may be considered a single training epoch.

Optionally, the model training process may be performed several times. Each trained model may be evaluated after a training epoch. In some embodiments the models may be validated based on one or more performance metrics, such as an averaged accuracy rate over time. After several models have been trained, the model with the best performance metrics may be selected to continue method 325.

At step 325, processor 221 executing training module 232 is caused to retrieve the remaining prompt-class pairs from training data 225, being the data that wasn't used to train the model at step 320. The retrieved prompt-class pairs are used to test the accuracy of the trained model's predictions. Specifically, prompts from the retrieved prompt class pairs are supplied to the model, and the model is caused to predict the class that is associated with the supplied prompt. The predicted class is compared to the stored class for the supplied prompt, and processor 221 is caused to calculate an accuracy score based on the number of classes that the model correctly predicts.

At step 330, processor 221 executing training module 232 is caused to compare the accuracy calculated at step 325 with an accuracy threshold, which may be a value retrieved from data 223. According to some embodiments, the accuracy threshold may be 90%, 95% or 98%, for example.

At step 335, processor 221 executing training module 232 is caused to determine whether the accuracy calculated at step 325 is higher than the accuracy threshold retrieved at step 330.

If the accuracy calculated at step 325 is higher than the accuracy threshold retrieved at step 330, processor 221 executing training module 232 is caused to proceed to step 340. At step 340, processor 221 is caused to finish training. The trained model and/or model parameters may be stored as part of recommendation module 233.

If the accuracy calculated at step 325 is not higher than the accuracy threshold retrieved at step 330, processor 221 executing training module 232 is caused to instead proceed to step 345. At step 345, processor 221 is caused to determine which class or classes of the classes stored in tool class data 224 had the highest incidence of incorrect results.

At step 350, processor 350 is caused to generate further training data. Specifically, processor 350 is caused to generate further prompts that would fall into the class or classes determined at step 345. This may be done by instructing a prompt generating machine learning model to generate additional prompts, as described above with reference to step 310.

Processor 221 may then proceed by returning to step 315, and proceeding to iteratively perform the steps of method 300 until the required accuracy is achieved.

Figure 4:
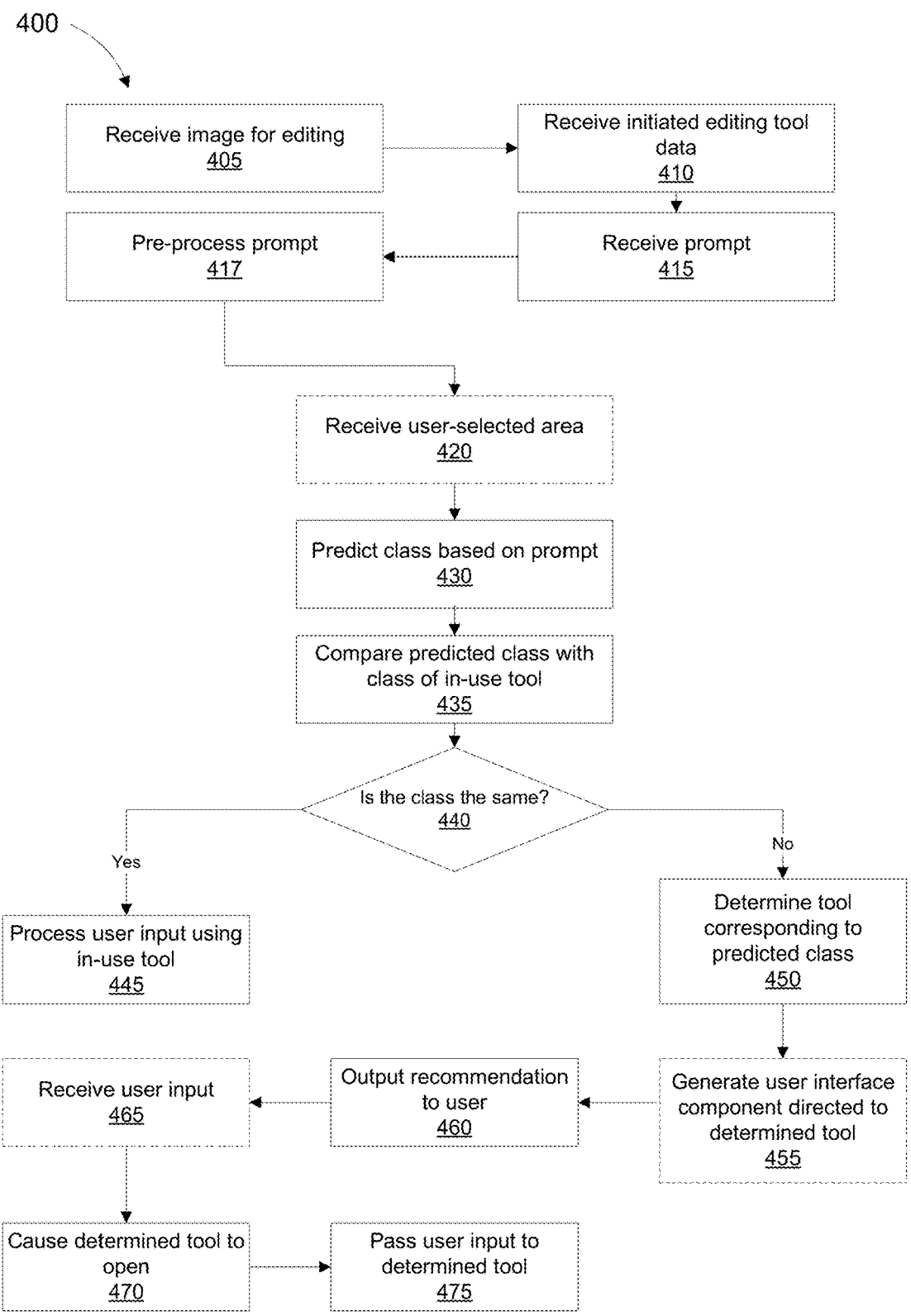
FIG. 4 is a process flow diagram of a method of generating image editing tool recommendations according to some embodiments.

FIG. 4 is a process flow diagram of a method 400 of generating image editing tool recommendations. In some embodiments, method 400 may be performed at least partially by processor 211 executing image editing application 215. In some embodiments, method 400 may be performed at least partially by processor 221 executing recommendation module 233. While certain steps of method 400 have been described as being executed by particular elements of system 200, such as by processor 211 or processor 221, these steps may be performed by different elements in some embodiments.

At step 405, processor 221 executing recommendation module 233 receives an image selected by a user for editing. The image may be received from processor 211 executing image editing application 215, when processor 211 accesses an image for editing. In some embodiments, the image may be a user-selected image. The accessing may be from a memory location, from a user I/O, or from an external device in some embodiments. For example, the accessing may be performed as a result of the user using a camera forming part of the user I/O 218 to capture an image for editing, or by the user selecting an image from a memory location. The memory location may be within the data 213 stored in memory 212 locally on user computing device 210, or in the data 223 in memory 222 stored in server system 220. Depending on where the image editing processes are to be performed, a copy of the retrieved image may be stored to a second memory location to allow for efficient access of the image file by processor 211 and/or processor 221. In some embodiments, a copy of the image may be stored in image data 227. According to some embodiments, the selected image may be caused to be displayed within a user interface of the image editing application 215, which may be displayed on a display screen forming part of the user I/O 218, as shown by image 110 in FIG. 1A and image 510 in FIG. 5A, for example. The image editing application 215 may also display a number of editing tools for selection by a user to perform image editing functions.

At step 410, processor 221 executing recommendation module 233 receives data corresponding to an initiated image editing tool. This input may be received from processor 211 executing image editing application 215. According to some embodiments, the image editing tool may be initiated in response to a selection of an editing tool that the user would like to use to edit the provided image within image editing application 215. This may be in response to the user interacting with one of the displayed editing tools, for example. In some embodiments, a default image editing tool may be initiated. Processor 211 executing image editing application 215 may cause an editing tool to initiate by executing image editing module 216 corresponding to the image editing tool to be used. For example, first image editing module 216-1 may be initiated.

Processor 221 executing recommendation module 233 is caused to identify a tool class associated with the initiated tool by accessing tool class data 224, and to store the tool class associated with the initiated tool to current tool class data 226. Processor 211 executing image editing application 215 may cause an indication of the selected tool to be displayed to the user via a display screen forming part of the user I/O 218, such as via the header 105 shown in FIGS. 1A and 1B and the header 505 shown in FIGS. 5A and 5B.

At step 415, processor 221 executing recommendation module 233 receives a prompt. The prompt may be received from processor 211 executing image editing application 215, and may correspond to a prompt entered by a user of image editing application 215 using user I/O 218. In some embodiments, the prompt may be a text prompt, an audio recording, a selection from a list, or any other suitable type of prompt. When the prompt is a text prompt, the prompt may be entered using a text input field, such as the text entry field 130 shown in FIGS. 1A and 1B or the text entry field 530 shown in FIGS. 5A and 5B. In some embodiments, the text input field may be a pop-up that appears on the user interface of the image editing application 215, which may be displayed on the display screen forming part of the user I/O 218. The text input field may, in some embodiments, be a permanent text field such as part of a menu, such as a side board or drop down menu as part of the user interface of the image editing application 215. When the prompt is an audio recording, the audio recording may be in the form of an .MP3 or. WAV, or any other suitable audio file format. Processor 221 executing recommendation module 233 may cause the prompt to be stored in prompt data 228.

The prompt may be input by the user in response to an instruction displayed via the user interface of the image editing application 215. The instruction may direct the user to supply a prompt appropriate to the selected image editing tool and to be used by the image editing tool to edit the image. For example, where the selected image editing tool is a tool for removing the background and/or extracting the foreground subject of an image, the user may be directed to enter a prompt corresponding to the foreground subject to be preserved. Where the selected image editing tool is a tool for erasing or removing part of an image, the user may be directed to enter a prompt corresponding to the part of the image that is to be deleted. Where the selected image editing tool is a tool for enhancing the image by adjusting the brightness, contrast, or other colour properties, the user may be directed to enter a prompt corresponding to the type of enhancement to be performed. Where the selected image editing tool is a tool for focusing on a subject of the image while blurring the rest of the image, the user may be directed to enter a prompt corresponding to the foreground subject to be focused on. Where the selected image editing tool is a tool for editing an existing object in an image, the user may be directed to enter a prompt corresponding to the type of edit that should be performed. Where the selected image editing tool is a tool for adding a new generated object into the image, the user may be directed to enter a prompt corresponding to the type of object that should be generated and inserted. Of course, these examples are illustrative only, and a number of instructions and prompts are possible.

Figures 5A, 5B:
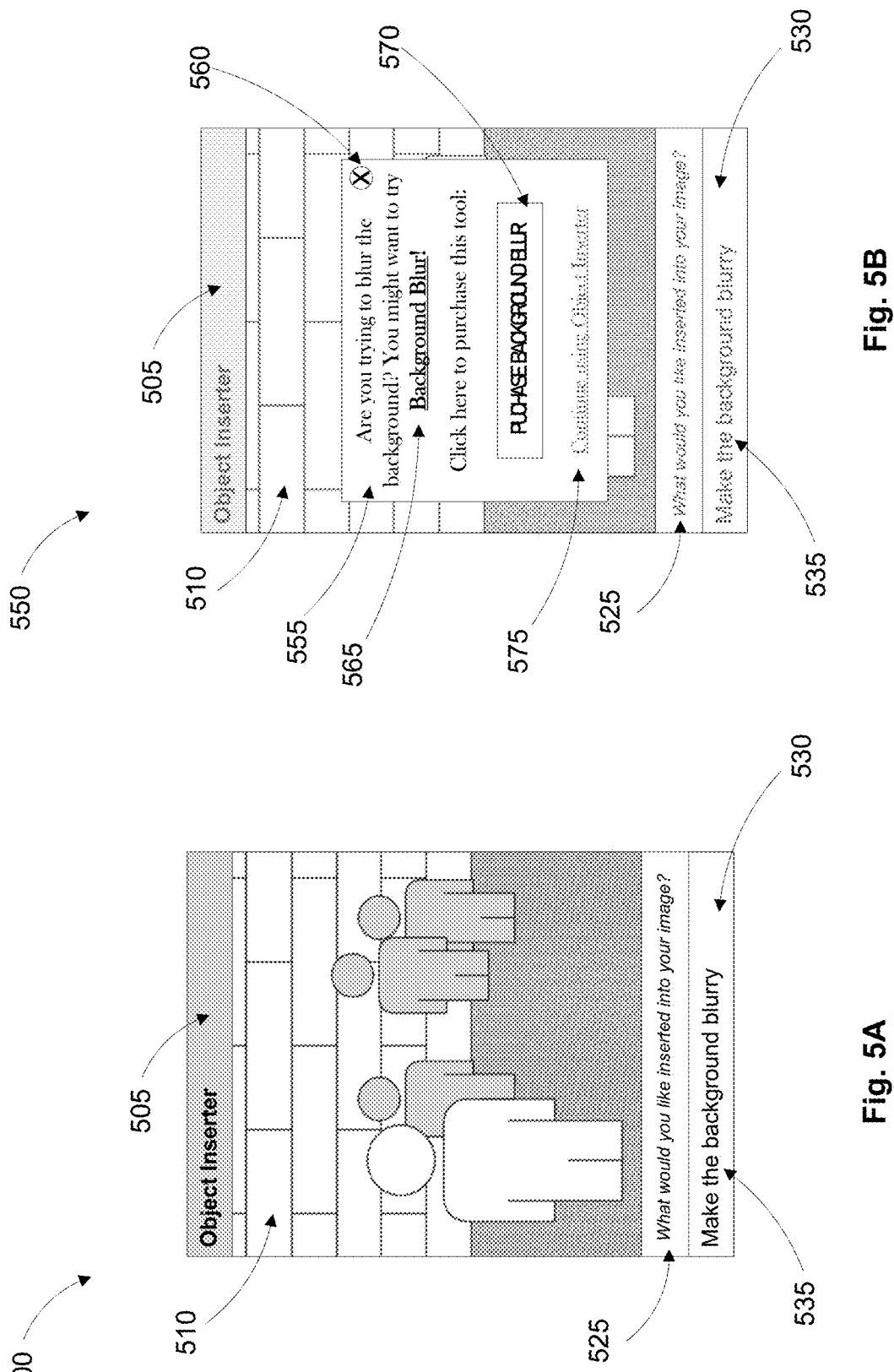
FIG. 5A shows another example user interface illustrating an image editing tool according to some embodiments.
FIG. 5B shows another example user interface illustrating an image editing tool recommendation according to some embodiments.

Some example images showing a prompt that may be received at step 420 are shown in FIGS. 1A and 5A, which illustrate prompts 135 and 535.

At step 417, processor 221 executing recommendation module 233 is caused to pre-process the prompt received at step 415. This may be by tokenising the prompt. In some embodiments, processor 221 may be caused to generate an encoding or embedding of the prompt. This may be generated using a text encoder such as OpenAI's CLIP text encoder. The tokenised, encoded or embedded prompt may be more readily interpretable by a machine learning model during the prediction process. The tokenised, encoded or embedded prompt may be stored in prompt data 228.

At optional step 425, processor 221 executing recommendation module 233 receives a user selected area. This may be received from processor 211 executing image editing application 215, and may be generated based on a user input corresponding to a selection of the area of the image that the user would like to edit using the selected image editing tool. The user may interact with a component of user I/O 218 to indicate which area of the image they wish to edit by creating the user selected area 120. For example, the user may use a brush tool, trace tool, or other tool to digitally select, trace, circle, or "paint" over the area where they wish to place the new visual element, to produce the user selected area. Processor 221 may store the user selected area in user selected area data 229.

Some example images showing a user selected area that may be received at step 425 are shown in FIGS. 1A and 5A, which illustrate user selected areas 120 and 520.

At step 430, processor 221 executing recommendation module 233 is caused to predict a class based on the prompt received at step 415, optionally pre-processed at step 417, and stored in prompt data 228. According to some embodiments, processor 221 may cause prompt data 228 to be processed by a recommendation generating machine learning model that has been trained based on method 300 as described above with reference to FIG. 3. In some embodiments, processor 221 may cause prompt data 228 to be processed by another suitable machine learning model that has been trained to solve multi-class classification problems and that is caused to output a class selected from the classes stored in tool class data 224 in response to a received prompt. Processor 221 may receive and store the predicted class in data 223.

At step 435, processor 221 executing recommendation module 233 is caused to compare the predicted class obtained at step 430 with the class of the in-use editing tool as stored in current tool class data 226.

At step 440, processor 221 executing recommendation module 233 determines whether the predicted class obtained at step 430 is the same as the class stored in current tool class data 226.

If processor 221 determines that the predicted class obtained at step 430 is the same as the class stored in current tool class data 226, then at step 445 processor 221 instructs processor 211 executing image editing application 215 to proceed to process the user input using the currently selected first image editing tool module 216-1.

If processor 221 determines that the predicted class obtained at step 430 is not the same as the class stored in current tool class data 226, then processor 221 executing recommendation module 233 instead proceeds to step 450. At step 450, processor 221 determines at least one image editing tool corresponding to the predicted class obtained at step 430. This may be by looking up the class in tool class data 224, to determine the image editing tool corresponding to the class.

Processor 221 may be caused to select one or more image editing tools associated with the predicted class to present to the user via a recommendation. In some embodiments, processor 221 may select every image editing tool associated with the predicted class, and present all of these to the user for selection. According to some alternative embodiments, processor 221 may select a subset of the image editing tool associated with the predicted tool class for presentation to the user. The subset may be selected by first ranking the tools using a scoring mechanism, and selecting a predetermined number of tools that are the highest ranked. In some embodiments, the subset may be selected by comparing the image editing tools to a number of selection criteria, and selecting only the tools that meet the selection criteria. The scoring mechanism and selection criteria may take into account user preferences, the image type being edited, the cost of the image editing tools, which image editing tools the user has already purchased, or which image editing tools are most popular among comparable users, for example.

At optional step 455, processor 221 executing recommendation module 233 generates a user interface component directed to the image editing tool determined at step 450. The user interface component may be a virtual button, a hyperlink, or other user interface element that allows a user to access the image editing tool. The access may be by directing the user to the tool, to a page that allows them to purchase the tool, to information about how to access the tool, to information about how to purchase the tool, or to other information about the tool, in some embodiments.

At step 460, processor 221 executing recommendation module 233 causes a recommendation to be output to the user based on the image editing tool determined at step 450. The recommendation may be displayed on a display screen of user I/O 218 in response to processor 211 executing image editing application 215 receiving the recommendation from processor 221. The recommendation may include one or more of the name of the tool, the user interface component generated at step 455, information about how to access the tool, information about how to purchase the tool, information about how to use the tool, or to other information about the tool.

At optional step 465, processor 211 executing image editing application 215 may receive user input corresponding to a user interaction with the user interface component generated at step 455, or another user interface component that causes processor 211 to execute the image editing module 216 associated with the image editing tool determined at step 450, which may be second image editing module 216-2, for example.

At step 470, as a result of the user input received at step 465 or automatically based on the generated recommendation, processor 211 is caused to initiate the image editing module 216 associated with the image editing tool determined at step 450, being second image editing module 216-2, for example. The class associated with the initiated image editing tool may be sent to server system 220 for storage as current tool class data 226.

At step 475, processor 221 executing recommendation module 233 may be caused to pass previously received user input to the initiated second image editing tool module 216-2. For example, image data 227, prompt data 228 and/or user selected area data 229 may be passed to the second image editing tool module 216-2 for processing. Processor 211 executing the second image editing tool module 216-2 may then be caused to perform editing of the received image data in accordance with the prompt and/or user selected area received.

FIG. 5A shows an example graphical user interface 500 that may be displayed by user I/O 218 of user computing device 210. Interface 500 may be presented to a user using user computing device 210 to execute image editing application 215, and specifically a first image editing module 216-1, which may be selected by a user as described above with reference to step 410 of method 400. In the illustrated embodiment, first image editing module 216-1 corresponds to an "Object Inserter" tool, as indicated by header 505. The "Object Inserter" tool may be a tool that generates and inserts a new image element into an image based on a user prompt. A user selected image 510 is displayed for editing. Image 510 may be selected by a user, and stored as image data 227, as described above with reference to step 405 of method 400.

In the illustrated example, interface 500 includes an instruction 525 to enter a prompt in response to the question "What would you like inserted into your image?". The user may enter a prompt in response to instruction 525 via text entry field 530, which may be stored as prompt data 228, as described above with reference to step 415 of method 400. In the illustrated example, the user has entered prompt 535, which reads "Make the background blurry".

Where the "Object Inserter" tool is configured to generate and insert a new image element into image 110 based on the user prompt, the result of entering the prompt "Make the background blurry" may not be what the user intended. Based on the prompt, the user may be intending that the background of image 510 be blurred, while retaining focus on the foreground elements. However, under normal operation, the "Object Inserter" tool may instead try to generate a new image element based on the user prompt and insert the generated image element into image 510. This may lead to unexpected and undesirable results.

According to some embodiments, system 100 may perform method 400 to generate an image editing tool recommendation which may assist a user in the situation described above. Specifically, as described above with reference to FIG. 4, system 100 may be configured to provide the user with a recommendation for an image editing tool based on their entered prompt 535 which may be better suited to the image editing function the user is trying to perform.

FIG. 5B shows an example graphical user interface 550 which may be displayed by user I/O 218 of user computing device 210 after step 460 of method 400 is performed. Specifically, interface 550 may be presented to a user in response to an image editing tool recommendation being generated by processor 221 executing recommendation module 233 based on the received prompt 535. In the illustrated example, interface 550 is presented to a user using an "Object Inserter" tool, in response to a user-entered prompt that indicates that the user was attempting to perform an image editing function that is better performed by a "Background Blur" tool.

Interface 550 shows the elements of the "Object Inserter" tool as displayed in FIG. 5A, such as the header 505, image 510, instruction 525 and text entry field 530. However, these user interface elements are inactive and are illustrated as greyed out. A pop-up box 555 is displayed over the inactive elements, presenting the user with an image editing tool recommendation. Pop-up box 555 reads "Are you trying to blur the background? You might want to try Background Blur! Click here to purchase this tool:". The words "Background Blur" are presented as a hyperlink 565. Hyperlink 565 may function as a user interface element that allows a user to access the recommended tool or further information about the recommended tool, for example. A virtual button 570 is also provided, which may also function as a user interface element that allows a user to access the recommended tool or further information about the recommended tool. An exit button 560 is displayed. Interacting with exit button 560 may cause pop-up box 555 to close, and the elements of the "Object Inserter" tool to become re-activated. Pop-up box 555 also includes a user interface element 575 that reads "Continue using Object Inserter". Interacting with user interface element 575 may also cause pop-up box 555 to close, and the elements of the "Object Inserter" tool to become re-activated.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method of generating an image editing tool recommendation, the method comprising:
   receiving a prompt entered by a user, wherein the prompt is a natural language prompt that describes an image editing function;
   processing the prompt using a tool class prediction model to predict a tool class associated with the prompt, wherein the tool class is associated with at least one image editing tool that is configured to perform the image editing function described by the prompt;
   determining an image editing tool associated with the predicted tool class; and
   outputting a recommendation to the user directing the user to the determined image editing tool.

2. The method of claim 1, further comprising accessing a tool class dataset containing at least one tool class to determine a number of available tool classes.

3. The method of claim 2, wherein the tool class prediction model is configured to predict the tool class associated with the prompt by selecting a tool class from the tool class dataset.

4. The method of claim 3, wherein the tool class prediction model is configured to select the tool class that is the closest match for the image editing function described by the prompt.

5. The method of claim 1, wherein the prompt is received in response to the user's interaction with a first image editing tool associated with a first tool class; the predicted tool class associated with the prompt is a second tool class; the determined image editing tool is a second image editing tool associated with a second tool class; and the recommendation directs the user to the second image editing tool.

6. The method of claim 5, further comprising comparing the first tool class with the second tool class, and outputting the recommendation in response to determining that the first tool class is not the same as the second tool class.

7. The method of claim 1, wherein outputting a recommendation comprises generating and displaying a user interface element that provides access to the determined image editing tool.

8. The method of claim 7, wherein the user interface element comprises a virtual button.

9. The method of claim 7, wherein the user interface element provides access to purchase the determined image editing tool.

10. The method of claim 1, further comprising, in response to the determined image editing tool being opened, passing the prompt to the determined image editing tool.

11. The method of claim 1, further comprising receiving a user-selected area of an image for editing.

12. The method of claim 11, further comprising, in response to the determined image editing tool being opened, passing the user-selected area of the image to the determined image editing tool.

13. The method of claim 1, further comprising, in response to the determined image editing tool being opened, passing an image to be edited to the determined image editing tool.

14. The method of claim 1, wherein tool class prediction model is a natural language processing model.

15. The method of claim 1, wherein outputting a recommendation to the user comprises initiating the determined image editing tool.

16. The method of claim 1, further comprising training the tool class prediction model to predict the tool class by providing the tool class prediction model with a plurality of prompt-class pairs, and training the tool class prediction model to predict a tool class based on a provided prompt.

17. The method of claim 1, further comprising training the tool class prediction model to generate an image editing tool recommendation, by:
   accessing a tool class dataset containing at least one tool class to determine a number of available tool classes;
   receiving a first labelled set of prompts each prompt being labelled with a tool class from the tool class dataset;
   training a first machine learning model to generate additional labelled prompts based on the first labelled set of prompts;
   adding the additional labelled prompts to the first labelled set of prompts to form a second labelled set of prompts; and training a second machine learning model on the second labelled set of prompts;

wherein, once trained, the second machine learning model is configured to receive a prompt and output a corresponding tool class label from the tool class dataset.

18. The method of claim 16, further comprising calculating an accuracy of the tool class prediction model, comparing the accuracy to a threshold, and, in response to the accuracy not meeting the threshold, further training the tool class prediction model by providing the tool class prediction model with additional prompt-class pairs.

19. A non-transitory computer-readable storage medium storing instructions which, when executed by a processing device, cause the processing device to perform the method of claim 1.

20. A computing device comprising:

the non-transitory computer-readable storage medium of claim 19; and a processor configured to execute the instructions stored in the non-transitory computer-readable storage medium.

\* \* \* \* \*